Aug. 15, 1961  A. M. STOTT ET AL  2,996,272
CONTROLLED THRUST EJECTION CAPSULE ROCKET
Filed May 17, 1960  3 Sheets-Sheet 1

INVENTORS
ALBERT M. STOTT
NORMAN J. WAECKER
BY
ATTORNEYS

INVENTORS
ALBERT M. STOTT
NORMAN J. WAECKER

ATTORNEYS

United States Patent Office 2,996,272
Patented Aug. 15, 1961

2,996,272
CONTROLLED THRUST EJECTION
CAPSULE ROCKET
Albert M. Stott, Aldan, Pa., and Norman J. Waecker, Masonville, N.J., assignors to the United States of America as represented by the Secretary of the Army
Filed May 17, 1960, Ser. No. 29,772
7 Claims. (Cl. 244—122)
(Granted under Title 35, U.S. Code (1952), sec. 266)

The invention described herein may be manufactured and used by or for the Government for governmental purposes without the payment to us of any royalty thereon.

This invention relates to a rocket ejection capsule by means of which personnel may be ejected with safety from a rapidly moving aircraft and has for an object to simplify the construction and operation of such a device.

Prevention of too high a rate of change in acceleration to eliminate serious bodily injury to personnel, has been an object of various proposals in ejection apparatus. A thruster has been provided with a damper for that purpose. A catapult has been provided with a rocket assist as another proposal. A rocket alone has been suggested to power an ejection capsule. A constant thrust type rocket effects too rapid a change in acceleration on starting. To vary the upward thrust of a rocket within safe limits has entailed a control valve and mechanism for automatically controlling such a valve and thus the rocket thrust. This automatic mechanism and valve has entailed complications adding weight with danger of the non-functioning when needed.

According to this invention a rocket is provided for an ejection seat without the necessity for the complications heretofore needed in obtaining an automatic control of thrust. More specifically a rocket has been provided with a simplified mechanism for obtaining a controlled thrust therefrom. This invention contemplates the use of a constant thrust type rocket permitting the use of solid fuel. Thrust is automatically varied by means of thrust vanes carried by the rocket, hinged together forming a wide angle between at the start of movement of the rocket, the vanes reducing initial thrust on starting by creating equal and opposite substantial lateral thrusts. After starting, these thrust vanes move toward each other reducing such lateral component of thrust and thus increasing upward thrust of the rocket. Automatic control of these vanes is achieved by a cam secured to the aircraft. A roller carried by each thrust vane moves over its cam and this cam is so shaped and located as to permit the angle between the vanes to diminish at a safe rate as the rocket and seat move upward.

Referring to the drawings.

Figure 3:
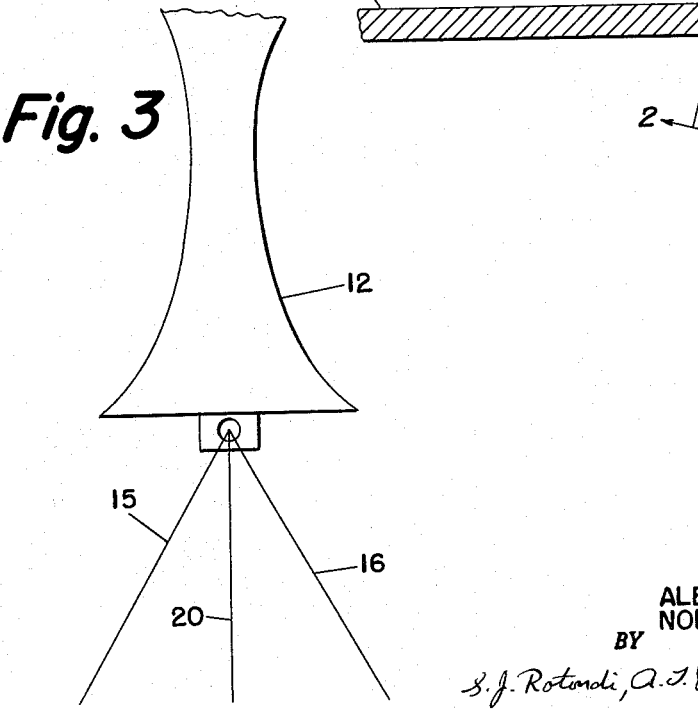
Figure 5:
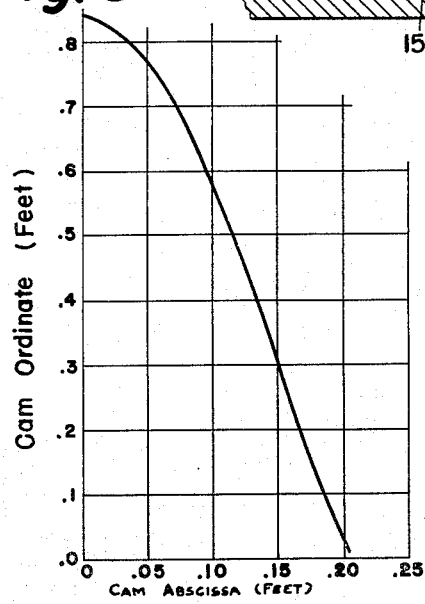
Figure 6:
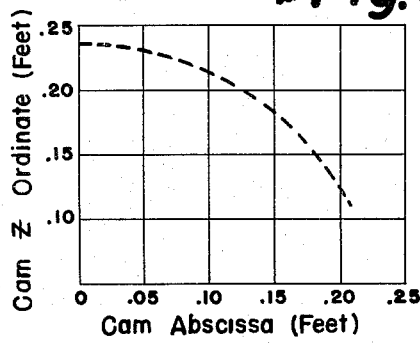
Figure 4:
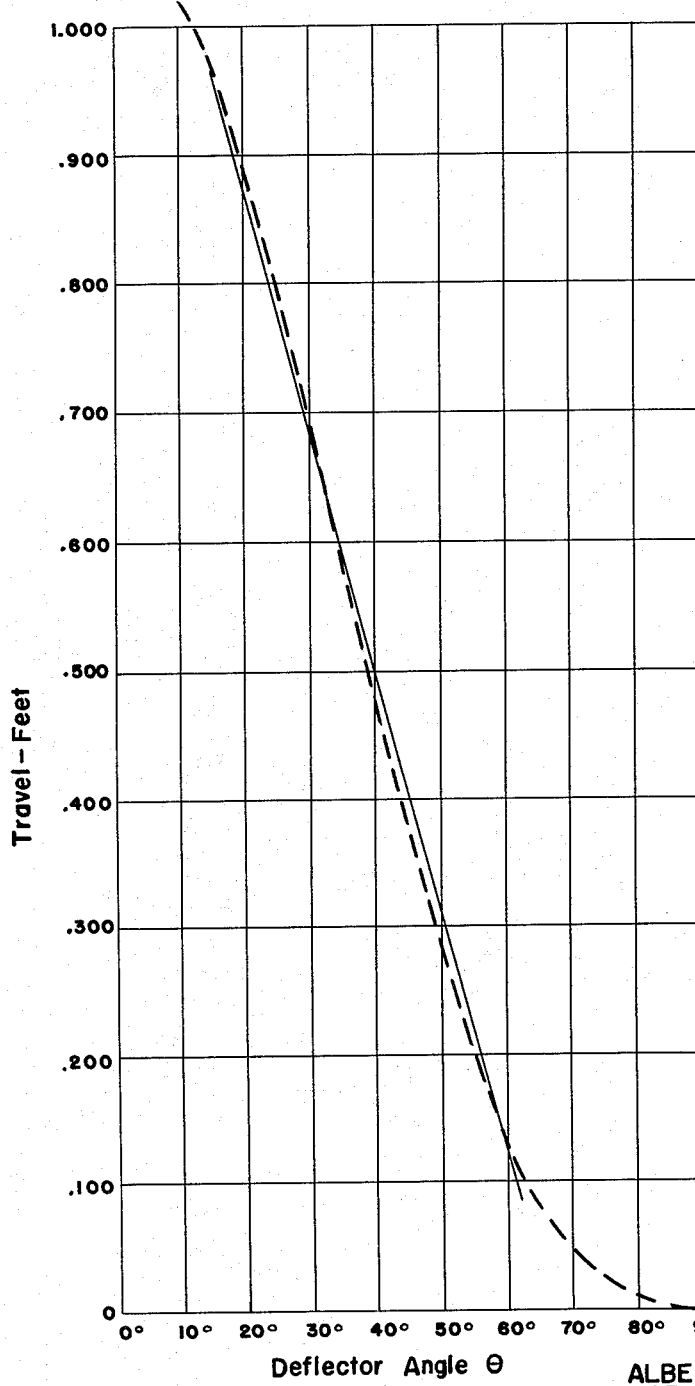

FIG. 3 shows the arrangement of the thrust near the mouth of the rocket venturi nozzle and forming a wide angle between them before initial upward motion of the seat and rocket, FIG. 4 is a graph showing the angular relation of each thrust vane to a line through a center of gravity of the seat and occupant on starting and during movement about a foot on its upward travel along the seat guide rails, FIG. 5 is another graph giving the relation between cam slope away from its starting position therefore the cam shape along a roller path the abscissa being measured along an axis transversely of the plane and the ordinate in the direction of the seat rails, FIG. 6 illustrates fore and aft movement along the cam roller path, the abscissa being measured along an axis transversely of the plane and the ordinate along an axis normal to the guided rails and a line transverse of the plane.

Figure 1:
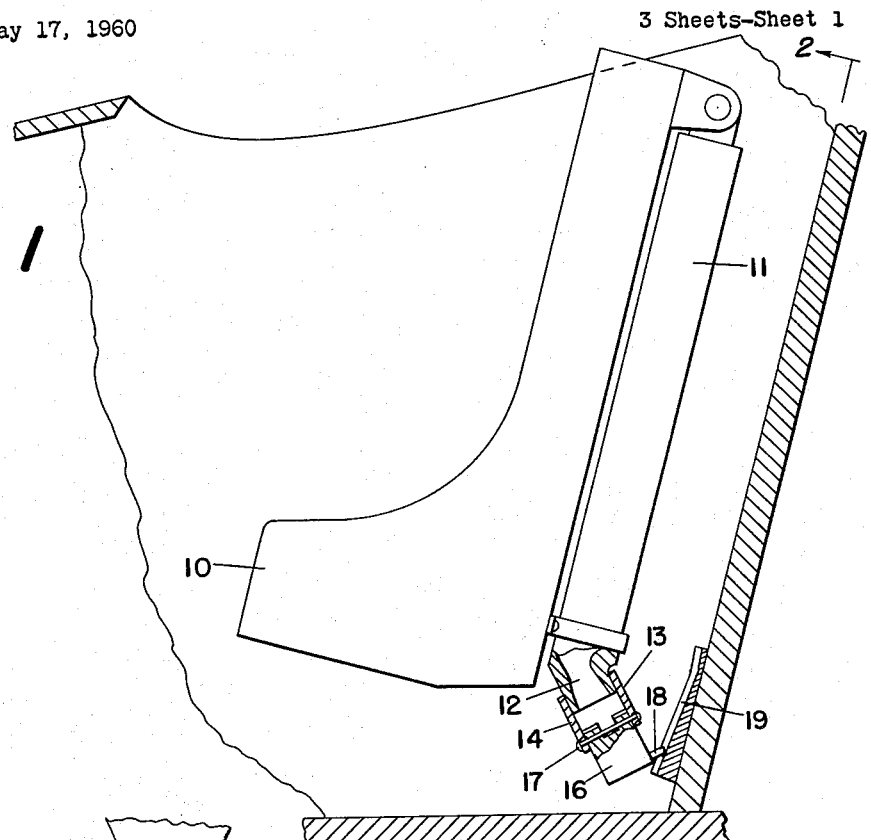
FIG. 1 is a side view showing an ejection seat to which a rocket is attached.
Figure 2:
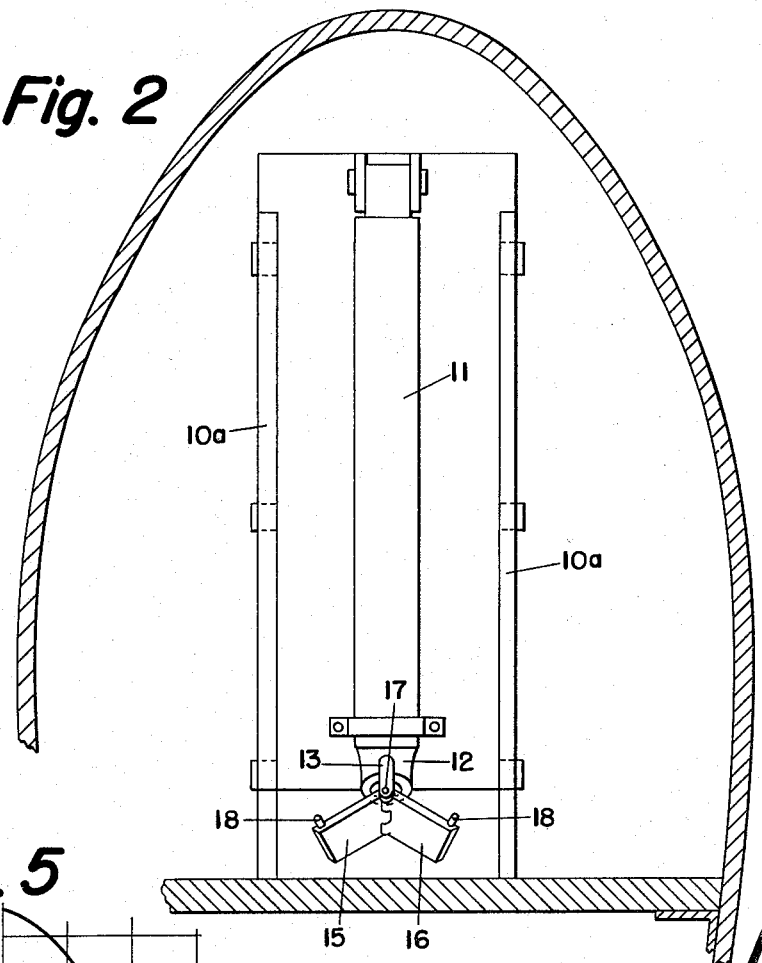
FIG. 2 is a rear view of the seat, rocket motor, and thrust vanes.

As shown in FIGS. 1 and 2 an ejection seat 10 movable along guide rails 10a, is provided with a rocket motor 11 attached back of the seat and having at its lower end a rocket venturi nozzle 12 from which issues products of combustion giving the rocket its upward thrust. Welded or otherwise secured to nozzle by metal strips 13 and 14 to which are attached the thrust vanes 15 and 16 hinged together by a hinge pin 17 passing through the supporting strips 13 and 14. Each vane carries at least one roller 18 transmitting thrust on its vane and moving over a cam surface 19. This cam surface is in reality two cam surfaces, one for each thrust vane with their slopes being mirror images. These two cam surfaces are not shown in FIG. 2.

In FIG. 3 is shown by a line drawing the approximate relative position of the thrust vanes 15 and 16 with respect to the outer end of the rocket nozzle 12 just before firing. Here the hinge pin 17 for the vanes 15 and 16 is preferably located adjacent the plane of the outer end of nozzle 12. The angle $\theta$ between a plane 20 through the axis of the rocket motor and hinge pin 17 is shown as being about 60° before the rocket is fired.

On firing the rocket for seat ejection in ways familiar to those skilled in the art, upward movement of the seat along the seat rails 10a generally parallel to a longitudinal axis of the rocket motor 11 begins a comparatively few milliseconds afterward. As shown in FIG. 1 the rocket nozzle is directed through the approximate center of gravity of the combined seat and occupant so that after the later is clear of the aircraft fuselage the rocket thrust will propel the load forwardly and upwardly with a minimum tendency to tumble and to too rapid deceleration. Partial thrust of the rocket while within the aircraft is absorbed by the guide rails 10a. Also part of the thrust of the rocket on starting is absorbed by the vanes 15 and 16. During the first 1.2 of an inch of travel slightly better results could be obtained were the vanes 15 and 16 opened wider to almost a full 90° to the axis 20 as indicated by the dotted curve in FIG. 4 below .1 of a foot and extending to almost 90°. The complications necessary to attain this advantage have not been deemed worth their disadvantage, which is why no advantage has been taken of this possibility for betterment. The portion of the graph in FIG. 4 above 1.2 inches and below .92 feet of the first part of travel being substantially a straight line is the reason for this portion only of the first foot of rocket travel being considered. This nearly straight line means that either a cam or a gear system may be used to bring the thrust vanes from their FIG. 3 position to one in which the vanes 15 and 16 are contiguous one another and parallel to the plane 20. It will be understood that the graph of FIG. 4 was determined by calculation rather than empirically. After reaching an upper portion of the cam surface 19 in FIG. 1 the rollers 18 secured to the thrust vanes 15 and 16 continue upward movement with the seat, its occupant, and the rocket while said cam surface 19 remains secured to the aircraft. After the rocket and its load leave the seat guide rails 10a the only portion of the rocket thrust not expended for upward movement of seat and occupant is that absorbed by the top surface of the thrust vanes when in their position of parallelism, but this cannot be helped. As these vanes have to be strong and thick enough to withstand the portion of the starting thrust of a rocket they are required to absorb. This graph of FIG. 4 was computed using the formula $$(\cos \theta = k\sqrt[3]{S}$$

where $\theta$ is the angle shown in FIG. 3, S is the distance in feet the rocket moves from its initial or starting position measured and $k$ is a constant, in this case equal to about .977. The ordinates in FIG. 3 is measured along the guide rails 10a.

The cam surface 19 as stated before may be considered as two separate cams placed in abutting relation, one for each thrust vane and its roller. A roller 18 on the left thrust vane 18 in FIG. 2 moves from left to right for the width of its travel and upward along its surface in FIG. 1. To obtain precise results a cam would have to be curved in 3 planes, longitudinally of the guide rails 10a (along a Y axis) transversely of the seat width (along an X axis), and also depthwise of the seat or at right angles to both of the preceding (along a Z axis). FIG. 5 shows the travel of a roller along the cam surface. FIG. 6 showing the curved line illustrates the way the cam surface needs to be curved in a direction of seat depth. It is because the graphs of FIGS. 4 and 5 have so much of their length a substantially straight line that it has been found satisfactory to greatly reduce the cost and simplicity of the cam by making it two dimensional, that is curved in two rather than 3 directions.

We claim:

1. In an apparatus for ejecting personnel from a high speed aircraft with the aid of a rocket, the combination therewith of the improvement enabling a rate of change in acceleration to be controlled within safe limits for a human body, said improvement including a substantially constant thrust type rocket, a seat to which said rocket is secured, a venturi nozzle on said rocket, a hinged pair of thrust vanes secured to said rocket and seat, the hinge axis for said vanes being substantially normal to an axis of said venturi nozzle, in the plane of said nozzle axis and adjacent the end of said nozzle, a roller carried by each vane remote from its hinge, and a cam surface for each roller and so positioned that on upward movement of said rocket said vanes are moved toward each other reducing lateral components of thrust, said cam surface being fixed to said aircraft.

2. An apparatus according to claim 1 in which each of said thrust vanes forms an angle of about 60° with the central axis of said nozzle prior to initial movement of said rocket and are moved to a position of near parallelism when said rocket has moved about a foot.

3. An apparatus according to claim 1 in which the angle of each vane to the central axis of said nozzle is varied by said cam according to a formula $$(\cos \theta = k\sqrt[3]{S})$$

in which $\theta$ is angle of each vane to a vertical through said seat, S is the distance moved by said rocket measured in feet and $k$ is a constant having a value depending on the nozzle angle and vane length, the value used in the calculations for the graph being $k = .977$.

4. An apparatus according to claim 3 in which each cam is made to possess a two dimensional change in shape.

5. In an apparatus for ejecting personnel from a high speed aircraft with the aid of a rocket, the combination therewith of the improvement enabling a rate of change in acceleration to be controlled within safe limits for a human body, said improvement including a substantially constant thrust type rocket, a seat to which said rocket is secured, a venturi nozzle on said rocket, a hinged pair of thrust vanes secured to said rocket and seat, the hinge axis for said vanes being substantially normal to an axis of said venturi nozzle, in the plane of said nozzle axis and adjacent the end of said nozzle, a cam for each vane and mechanism located between each vane and its cam and actuated by said rocket for moving said thrust vanes toward a position of parallelism from an initial position in which said vanes have a wide angle between them during an early part of upward movement of said seat by said rocket, said mechanism having an element movable over each cam as the seat starts its upward motion.

6. In an apparatus for ejecting personnel from a high speed aircraft with the aid of a rocket, the combination therewith of the improvement enabling a rate of change in acceleration to be controlled within safe limits for a human body, said improvement including a substantially constant thrust type rocket, a seat to which said rocket is secured, a venturi nozzle on said rocket a hinged pair of thrust vanes secured to said rocket and seat, the hinge axis for said vanes being substantially normal to an axis of said venturi nozzle in the plane of said nozzle axis and adjacent the end of said nozzle, a cam for each vane and mechanism located between each vane and its cam and actuated by said rocket for moving said thrust vanes toward a position of parallelism from an initial position in which said vanes have a wide angle between them during an early part of upward movement of said seat by said rocket, said mechanism having an element movable over each cam as the seat starts its upward motion said vanes being brought to said position of parallelism during about the first foot of travel of said seat.

7. The combination with an aircraft, of an ejection seat, a rocket motor for said seat, movable vanes fixed to said motor against which gas from said motor impinges and a cam for each vane controlling the position of its vane, said cam for each vane being secured to said aircraft whereby the aircraft becomes a reference body to establish the thrust deflection from said motor according to relative travel of said motor and seat.

References Cited in the file of this patent

UNITED STATES PATENTS

| | | |
|---|---|---|
| 2,620,622 | Lundberg | Dec. 9, 1952 |
| 2,758,805 | Graham | Aug. 14, 1956 |
| 2,872,138 | Vogt | Feb. 3, 1959 |
| 2,937,830 | Fulton | May 24, 1960 |